United States Patent [19]

Comte et al.

[11] 4,291,674
[45] Sep. 29, 1981

[54] PROCESSES AND DEVICES FOR CLIMATIZING GREENHOUSES

[75] Inventors: Paul Y. Comte, Antibes; Rene J. Repetti, Mougins, both of France

[73] Assignee: Agence Nationale de Valorisation de la Recherche, Neuilly-sur-Seine, France

[21] Appl. No.: 13,688

[22] Filed: Feb. 21, 1979

[30] Foreign Application Priority Data

Feb. 17, 1978 [FR] France .................................. 78 04999

[51] Int. Cl.³ ............................ F24J 3/02; A01G 1/00
[52] U.S. Cl. ..................................... 126/419; 47/17; 126/437
[58] Field of Search ............... 237/1 A; 126/271, 419, 126/437; 350/267; 47/17

[56] References Cited

U.S. PATENT DOCUMENTS

| | | | |
|---|---|---|---|
| 3,257,903 | 6/1966 | Marks | 350/267 |
| 3,612,657 | 10/1971 | Sawyer | 350/267 X |
| 3,695,681 | 10/1972 | Dockery | 350/267 X |
| 3,741,631 | 6/1973 | Laing | 350/267 |
| 4,108,373 | 8/1978 | Chiapale et al. | 237/1 A |
| 4,116,222 | 9/1978 | Seifried | 126/900 X |
| 4,147,002 | 4/1979 | Kautz | 47/17 X |

*Primary Examiner*—William E. Wayner
*Attorney, Agent, or Firm*—Bucknam and Archer

[57] ABSTRACT

The object of the invention consists of processes and devices which make it possible to vary the opacity of the covering of a greenhouse in order to maintain within the latter a luminosity which is substantially constant.

A greenhouse according to the invention includes a transparent covering and transparent collectors, which are located parallel to the covering, which make up part of a closed circuit in which water containing in suspension a product P which partly absorbs the visible spectrum, and the infra-red, is caused to circulate and the concentration of product P in the suspension is varied in order to modulate the coefficient of absorption within the visible spectrum.

17 Claims, 7 Drawing Figures

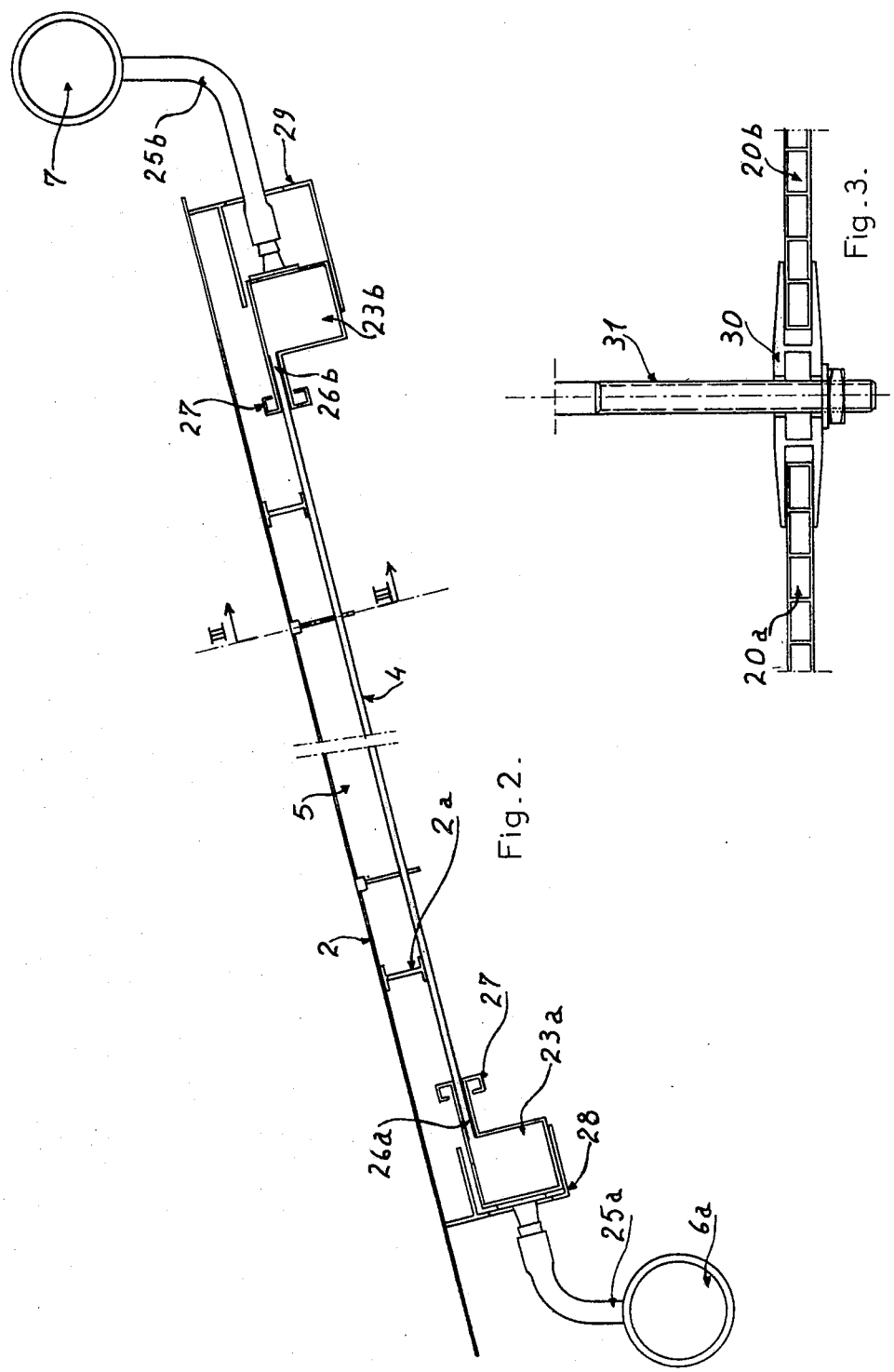

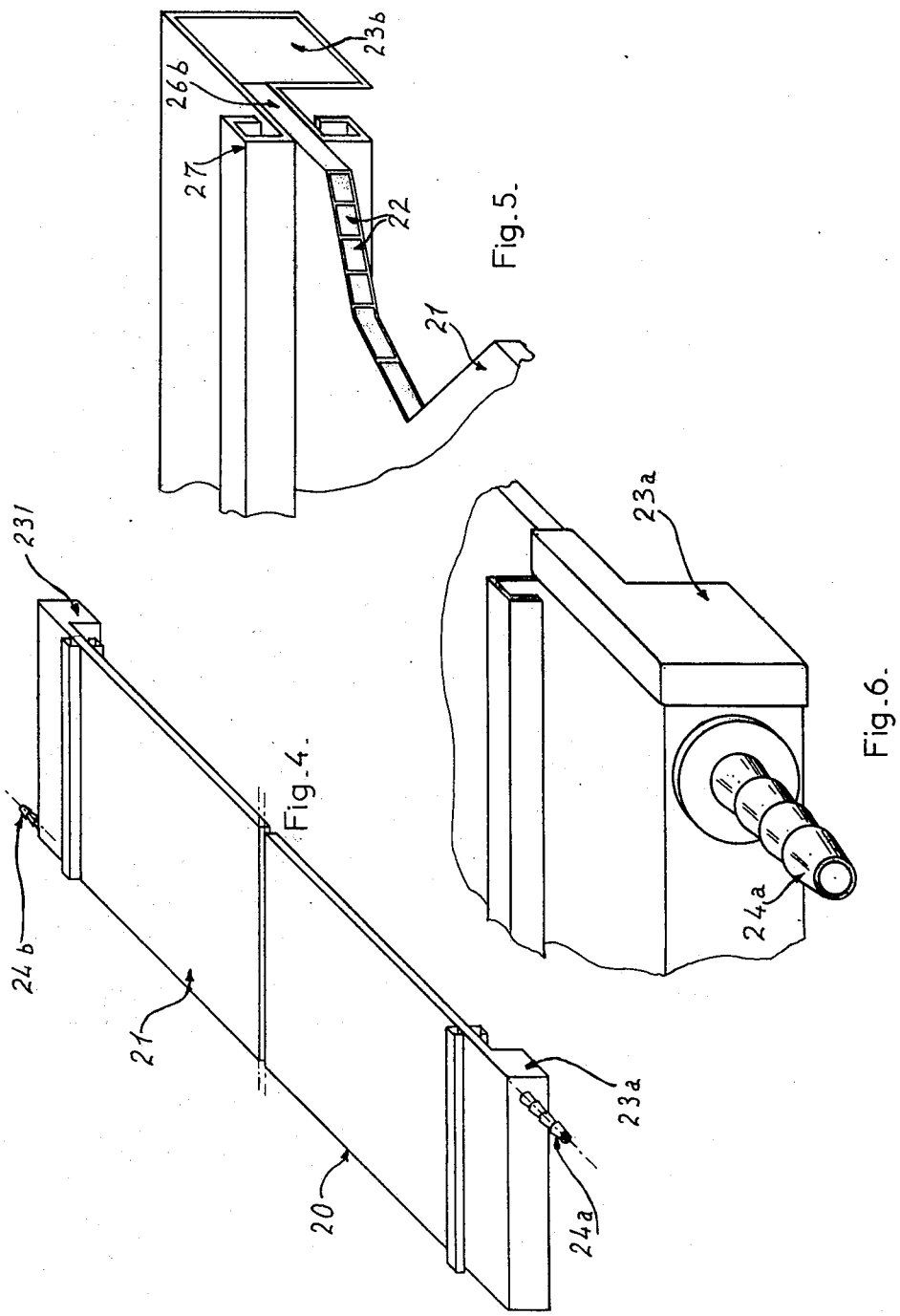

PROCESSES AND DEVICES FOR CLIMATIZING GREENHOUSES

The present invention relates to processes and devices for climatising greenhouses and other shelters for the growing of plants.

The field of the invention is that of the construction and the usage of greenhouses and other shelters for growing.

Greenhouses for growing are already known which comprise a transparent covering and collectors for solar energy which are incorporated in or associated with the said covering, which are collectors which have a selective absorbing power, so that they absorb infra-red radiation and allow ultra-violet and visible radiation to pass through, these being necessary for the development of the plants.

Such greenhouses have the advantage of reducing the temperature inside the greenhouse during the hours when the sun is shining and recovering thermal energy which is used for heating the greenhouse during the colder hours of the night.

In existing installations, a heat-transporting liquid circulates between a heat storage reservoir and the heat exchange surfaces which act both as collectors during the day time and radiators during the night. These arrangements have certain disadvantages.

Firstly, the energy loss at the level of the radiators which are located close to the covering are large during the night and the heat energy which is yielded at the level of the covering of the greenhouse is not utilised by the plants at a level of high yield.

Furthermore, in known installations, the selective absorbing power is due, either to the walls of the collector which are filtering walls which absorb a portion of the light spectrum, or is due to a heat-carrying liquid which is coloured, for example a solution of copper chloride, which selectively absorbs certain radiations. In both of these cases, it is practically impossible to modulate the absorbing power of the collector as a function of the intensity of the light radiation and the temperature inside the greenhouse.

It is possible to vary the flow rate of the heat-carrying liquid through the collector in order to maintain substantially constant the temperature of the liquid which is passing out from the collectors but it is not possible to vary the transparency of the collector.

The greenhouses according to the invention include in a known manner, a covering which is transparent and absorbs selectively which constitutes a shade and which protects the plants whilst at the same time recovering thermal energy.

One aim of the present invention is to provide means which make it possible to vary, automatically or non-automatically, the opacity of this shade in order to create and maintain an artificial climate inside the greenhouse which is appropriate to the nature of the plants and the stage of development of these despite variations in external luminosity and temperature.

This aim is met by means of a process for climatising greenhouses and other shelters for the growing of plants which are provided with a transparent covering which includes transparent channels in which a fluid is caused to circulate which transmits solar light partially, this being a process according to which the transmission factor and the absorbing power of the said fluid is modulated as a function of the intensity of the external luminosity and optionally of the temperature inside the greenhouse, in such a way that the covering constitutes an artificial shade which has a variable and controllable opacity.

During periods of sunshine, a suspension in water of a product which is heavier than water which is transparent to ultra-violet radiation and which absorbs the visible spectrum is caused to circulate in the transparent absorbers, which are arranged under the transparent covering of the greenhouse, and the proportion of product in suspension is caused to vary as a function of the intensity of the luminous flux and/or the temperature inside the greenhouse by causing the said suspension to circulate in a sedimentation reservoir which makes it possible to modulate the amount of product which becomes sedimented in the bottom of the reservoir.

According to a first process according to the invention, the product in suspension in the water is a liquid which consists of a mixture of one or more organic compounds selected from the group constituted by the phtalates of an alkyl monovalent group or ricin oil and one or more surfactant liquids, which are preferably selected from aromatic sulfonates or the alkaline or ammonium salts of these.

According to a further process, the product which is in suspension in the water is a solid mineral substance, which is finely divided, for example an oxide of zinc or titanium or a metallic salt, such as basic bismuth nitrate.

A device according to the invention comprises:

solar collectors which are located under the transparent covering of the greenhouse, which comprise two transparent plates, which define between themselves a space in which a heat-carrying liquid circulates comprising a suspension in water of a product which is heavier than water which selectively absorbs light;

a closed circuit including the said solar collectors;

and means for causing the concentration of the said suspension to vary as a function of the intensity of luminous flux and/or the temperature inside the greenhouse.

In a preferred embodiment, the closed circuit includes a sedimentation reservoir which is provided with several fluid outlets which are arranged at the lower portion of the said reservoir and means for automatically closing and opening the said outlets as a function of the intensity of the luminous flux and/or the temperature inside the greenhouse, in such a way that the concentration and the absorbing power of the suspension which circulates in the collectors are able to vary.

The result of the invention is the provision of new covered greenhouses or shelters, which are intended for the growing of plants and vegetables of all types.

The greenhouses according to the invention make it possible to create and to automatically maintain an artificial climate inside an enclosure by being in a position to control at one and the same time the temperature, the luminosity and the energy received, despite variations in the outside climate.

They make it possible to recover a part of the solar energy and to modulate this recovery by causing the absorbing power of the covering to vary.

The recovered energy is stored and utilised during the night for heating the greenhouse which results in economising on energy and expenses for heating.

It is known that plants only utilised for photosynthesis a portion of the spectrum which is located in the ultra-violet and the visible spectrum.

The filtering fluid which is used in the greenhouses according to the invention is preferably a suspension in water of a liquid or powdery product, which selectively absorbs the visible spectrum and which is transparent to ultra-violet rays.

It is known that water absorbs infra-red radiation.

The heat-carrying liquid which is used consequently constitutes a selective filter which absorbs infra-red radiation and a portion of the visible spectrum. The coefficient of absorption in the visible spectrum depends on the proportion of the product which is in suspension in the water.

Moreover, in climates which are very sunny, the product in suspension is advantageously a product of a white colour, which has reflecting properties in the visible spectrum, so that by varying the concentration of the suspension, the reflecting power of the heat-carrying liquid can be varied, which makes it possible to avoid heating up of the greenhouse during the day.

Measurements which it has been possible to carry out have shown that when the proportion of the product in suspension is of the order of 3% of the total weight, 99% of the energy of the visible spectrum was absorbd with a sheet thickness of 5 mm. By varying the proportion of the product in suspension in the water between 0.1% and 3%, the coefficient of absorbtion and of reflection of the visible spectrum is modulated and an artificial shade is created which has a variable opacity which is also controllable, which makes it possible to produce an effect on photosynthesis, phototropism and photomorphogenisis.

The collectors according to the invention comprise selective transparent thermal radiation receivers which have multiple functions. One function is that of providing selective filters which stop infrared radiation and a variable portion of the visible spectrum by absorbing them and optionally reflecting them thus constituting adaptable shades.

They also fulfill the function of providing thermal screens which make it possible to have an influence on the temperature inside the greenhouse.

The arrangement of the collectors under the covering, from which they are separated by a sheet of air, makes it possible to obtain good thermal insulation which reduces thermal exchange with the outside, in particular during the night. The coefficient of thermal loss from the covering is reduced by 50%.

The greenhouse effect is preserved due to the arrangement of the collectors under the transparent covering.

As distinct from certain known greenhouses, the collectors according to the invention are not used as radiators during the night. The energy which has been captured during the day is accummulated in accummulation reservoirs, preferably in several reservoirs which are mounted in cascade in order to improve the yield by making use of stratification in these reservoirs.

Water which has been heated during the day is used during the night in the heating devices on the ground or by pipes which are suspended in the air or by unit heaters or by using any other heating means for the enclosure which makes it possible to use water at a relatively low temperature, of the order of 30° C.

One interesting advantage of the devices according to the invention resides in the fact that they can easily be adapted for use with already existing greenhouses due to the fact that the collectors are located underneath the transparent covering.

A further advantages of the device in accordance with the invention including storage reservoirs with stratification resides in the fact that the collectors are supplied during the day with cold water, which reduces the temperature of the panels and their emissivity.

A further advantage of the collectors according to the invention which have variable opacity is that they replace all the present-day processes of limewashing and seasonal painting of the covering of the greenhouses and the covering of these by means of screens or sheets which are intended to create shading in order to protect the plants from the sun during the day.

A further advantage of the processes and devices according to the invention resides in the fact that the products P in suspension or in emulsion in the water diffuse the light, which makes it possible to obtain at every point within the inside of the greenhouse light which is well distributed.

The following description refers to the attached drawing which show, without any limiting nature, one embodiment of a greenhouse or shelter for growing according to the invention.

FIG. 2 is a cross-sectional view of a portion of the covering.

FIG. 3 is a partial cross-section according to III—III in FIG. 2 at the joint between two collectors.

FIG. 4 is a perspective view of one embodiment of a collector.

FIGS. 5 and 6 are views on a larger scale of portions of FIG. 4.

Figure 1:
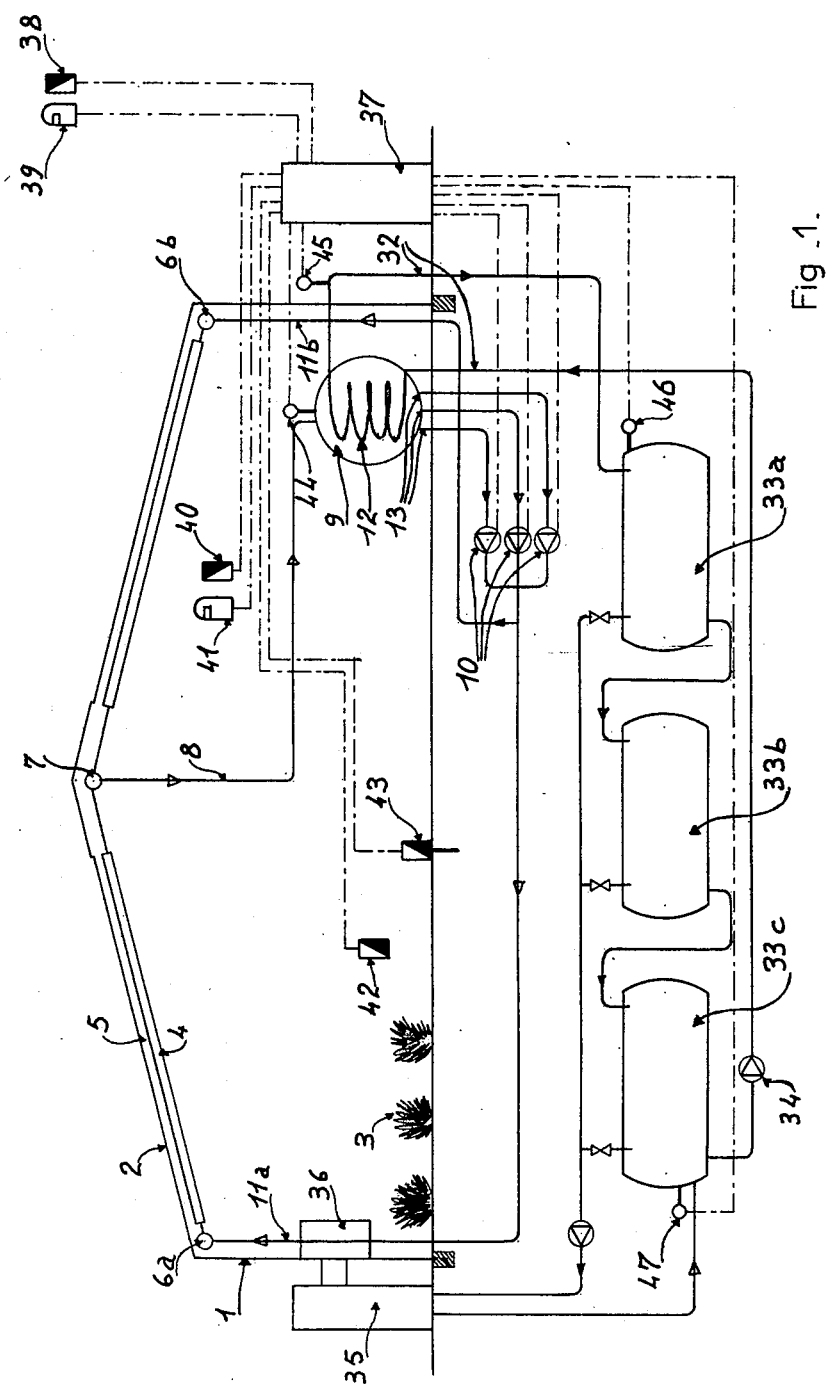
FIG. 1 is an overall schematic view of a device for climatisation according to the invention.

FIG. 1 shows a greenhouse 1 or any other shelter for growing which is similar, of any known type, having a transparent covering 2, in which plants 3 are cultivated, which may be, for example, vegetables, flowers, ornamental plants, fruit or seed-bearing plants, mushrooms etc.

Panels 4 are located under the covering 2, which comprise two transparent walls between which a heat-carrying liquid circulates. The panels 4 are separated from the covering by an intermediate space 5. The reference 6a and 6b designate the collectors from which the heat-carrying liquid starts. The reference 7 designates the collector(s) for return of the heat-carrying fluid.

The heat-carrying fluid circulates in a closed circuit which includes a return pipe 8, a sedimentation reservoir 9, circulation pumps 10, which for example are three in number, and pipes 11a and 11b which discharge into the entry collectors 6a and 6b.

Figure 7:
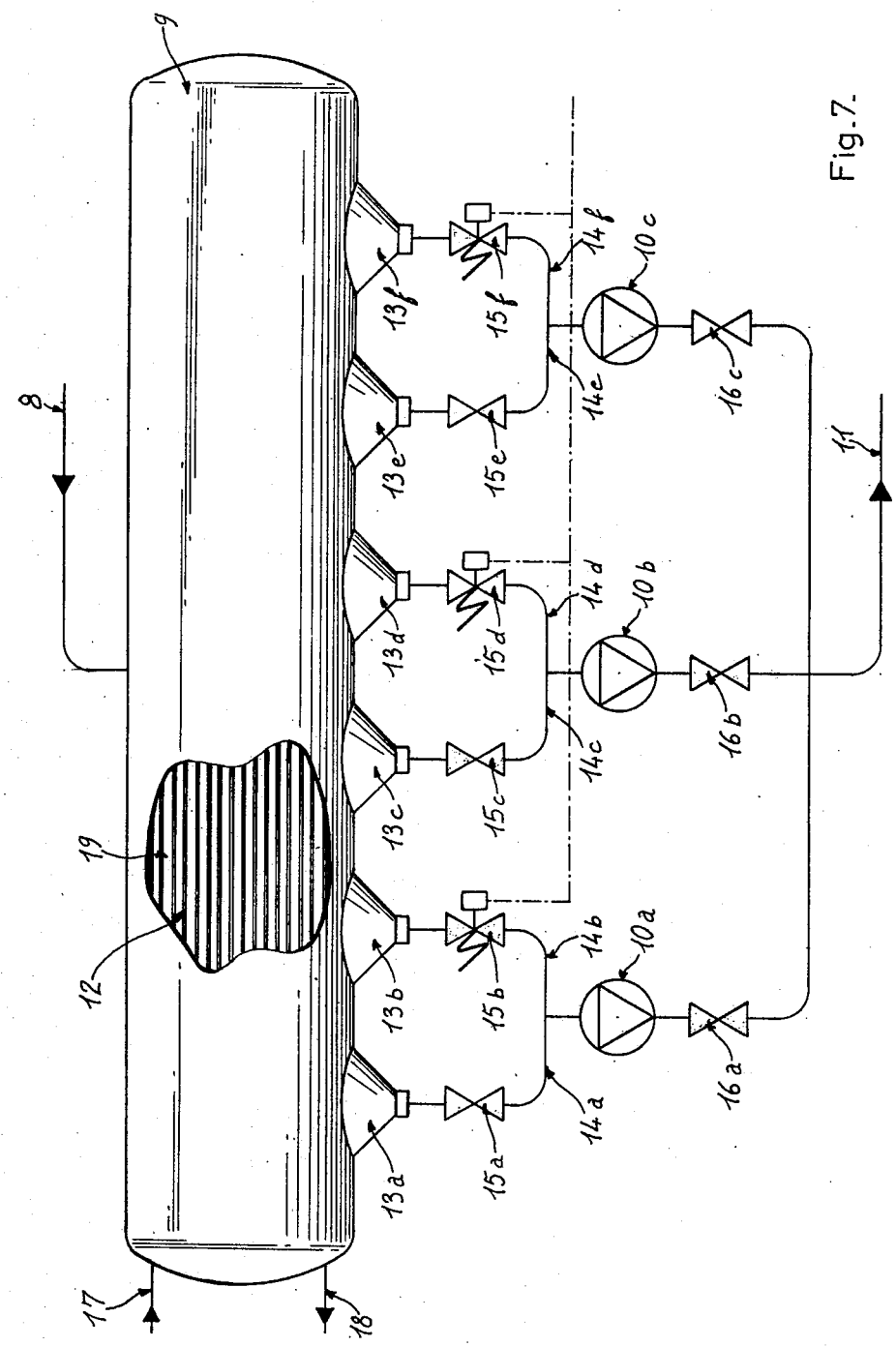
FIG. 7 is a view of the sedimentation reservoir and the liquid outlet of this.

In the example shown, the reservoir 9 also performs the function of the exchanger which is shown schematically by the tortuous path 12. The sedimentation reservoir 9 is, for example, a horizontal cylinder of elongated shape which is equipped with several outlets for liquid 13 which are distributed along the base of the reservoir. FIG. 7 shows on a larger scale the decanting reservoir 9 which has six outlets 13a, 13b, 13c, 13d, 13e and 13f which have the shape of converging pipe stubs distributed along the lower generatrix of the reservoir.

Each pipe stub is connected to one conduit which are respectively 14a to 14f including a valve, respectively 15a to 15f.

The conduits 14 are connected two by two to a circulation pump 10a, 10b, 10c.

The outlets of the three pumps are connected in parallel via the intermediary of a manually controlled valve 16a, 16b, 16c, on the input conduit 11. The conduit 8 for return of heat-carrying fluid arrives at the upper part of reservoir 9. Partial removal of the surface shows the bundle 12 of heat exchange tubes in which a heat-carrying liquid circulates which enters via an entry pipe 17 and which flows out through a pipe 18. The heat-carrying liquid 19 which flows in the panels 4, circulates at a low speed through the tubes of bundle 12.

In the example which is shown in FIG. 7, the valves 15a, 15c and 15e are manual and the valves 15b, 15d and 15f are motorised valves, for example electrovalves, which are controlled automatically. As a variation, all the valves 15 may be electrovalves or, on the contrary, in a non-automatic installation, all the valves 15 could be manually-operated valves.

The heat-carrying fluid 19 is a suspension or an emulsion in water of a product P which is heavier than water, so that it produces sedimentation in the bottom of reservoir 9 where the product P becomes deposited.

The product P is selected in such a way that it has selective absorbtion properties towards solar light. It is permeable to ultraviolet rays (U.V.) close to the visible spectrum. It is capable of absorbing infra-red rays (I.R.) close to the visible spectrum and far I.R. It absorbs the visible spectrum in a uniform manner over the whole width of the spectrum.

The coefficient of absorbtion of the visible spectrum of the suspension varies linearly as a function of the concentration of product P in the suspension.

Since water absorbs the infra-red radiation, by causing the concentration of Product P in the suspension to vary, a heat-carrying liquid 19 is obtained which does not absorb U.V., which totally absorbs I.R. and whose coefficient of absorbtion of the visible spectrum varies on a proportionate basis with the concentration of product P in the suspension.

The product P should have, moreover, certain properties. Preferably, it should be photochemically stable, non-corrosive, non-toxic, non-polluting, biodegradable, should have bactericide and algicide properties, be dispersible in water and have a low coefficient of emissivity. It should be stable with respect to oxidation and should be non-abrasive.

In very sunny climates, the amount of thermal energy which is absorbed during the day may become greater than the night time heating needs and the temperature of the suspension which is circulating in the collector can become too large. In this case, a product P of white colour is used which has reflecting properties in the visible spectrum, so that it partly absorbs the visible spectrum and reflects a part of this.

According to a first embodiment, the product P in suspension or in emulsion is a liquid which is essentially composed of a mixture:

of on the one hand, one or several organic liquids selected from the group consisting of the phtalates of a monovalent alkyl group such as methyl, ethyl, butyl, iso-octyl or constituted by ricin oil;

of on the other hand, one or several surfactant liquids selected preferably from aromatic sulfonates or the alkaline or ammonium salts of these.

The surfactants facilitate contact between the oily organic liquid and the water and improve the dispersion in the water of the liquids which are in suspension.

The respective proportions of the liquid in suspension are for example from 50 to 60% of organic product and of from 40 to 50% of surfactant. This liquid mixture may advantageously have a bactericide and/or algicide added to it for the purpose of preventing the proliferation of micro-organisms. The proportion of these additives should be kept low, of the order of 5 to 10% in order to not change the optical properties of the suspension.

According to a second embodiment, the product P which is in suspension in the water is a solid mineral product in the finely divided state, for example an oxide of zinc or of titanium or a metallic salt such as basic bismuth nitrate which can be mixed with a surfactant liquid. These solid products, of white colour, have the advantage of reflecting in part the visible light and absorbing it in part. They are used advantageously in very sunny countries, for example in a mediterranean climate.

It is also possible to add to the water an amount which is comprised within the range 0.1% to 0.5% of the total weight of a gel belonging to the family of cellulose ethers in order to vary the viscosity and consequently also the rate of sedimentation of the particles in suspension.

In both these cases, whether the product P is a liquid or a solid, only a small amount of the product P is necessary in the suspension, of the order of 3%, in order for the coefficient of absorbtion to be a uniform 99% over the whole width of the visible spectrum. By varying this proportion between 0.1% and 3% by making use of controlled sedimentation, the opacity of the shade can be varied from a shading which is completely transparent to visible radiation right up to a shading which is completely opaque to this radiation.

FIGS. 2 to 6 show a preferred embodiment of the collector panels 4. FIG. 2 shows a portion of the transparent roofing 2, for example a roofing which is in glass or in a plastics material which is supported by frame elements 2a.

The panels 4 are laid under the frame, in such a way that they, together with the covering 2, define an intermediate space 5.

FIG. 4 shows a self-supporting panel element, which is given the reference numeral 20.

This panel has, preferably, a width of 0.60 m which corresponds to the width in current use of frames for glass in the roof of a greenhouse. This panel 20 is composed of a plate having a honeycomb structure 21, which includes parallel channels 22, which are arranged according to the line of greatest slope as is shown in FIG. 5. The plates 21 are in a transparent material. Preferably, plates in plastics material are used which are obtained by extrusion, injection, welding or bonding. The thickness of plates 21 is of the order of several millimeters to ensure that the thermal inertia and the weight of collectors 4 are very low.

In the example shown, the plates 21 are plain but may also be bent if the covering 2 is curved. The material which constitutes panel 20 should have properties which meet the following requirements as closely as possible. It should be transparent to U.V. close to the visible and to the visible spectrum with an energy and optical transmission factor of greater than 80%. It should have good mechanical strength under conditions of humid heat at greater than 90° C. It should be resistant, non-fragile, light and flexible. It should not lose its mechanical and optical properties with the passage of time. Preferably polymerisable resins of the polycarbonate family are used, which meet the above criteria well. It is also possible to use methyl polymethacrylates which are however more expensive.

Each panel element 20 includes, moreover, along its small side, a collector 23a, 23b, of rectangular cross-section or square cross-section, which include a ribbed connector, respectively 24a and 24b, these connectors being arranged diagonally. A flexible conduit 25a and 25b is connected to each connector and these join the panel respectively to the inlet collector 6a and the return collector 7.

The collectors 23a and 23b are manufactured in the same material as the plate 21. They each include a longitudinal opening, respectively 26a and 26b, along their upper edge, which has a width which is slightly greater than the thickness of the plate 21. Each opening 26a and 26b is arranged between two ribbed plates 27 and the small sides of the plate 21 are engaged between the two plates 27 and are bonded and/or welded to the latter. The whole unit consisting of each collector 23a or 23b and the ribbed plate 27 is manufactured in one piece, for example by extrusion. Thus it is possible to obtain panel elements having any width or length whatsoever by assembling plates 21 and collectors 23 which are cut at the desired length from elements of great length which are manufactured in series.

FIG. 2 shows the mounting of the collecting elements underneath the roofing.

The lower collector 23a is located on a fixed support 28, in folded metal sheet, which closes the intermediate space 5. The upper collector 23b is placed on a support in folded metal sheet 29 inside of which it is able to slide in order to allow for expansion of the panels.

FIG. 3 shows the joints between two panel elements 20a and 20b. These are connected, along their large side, by double-lipped joints 30, which are suspended from the frame by hangers 31.

It is necessary to prevent the temperature inside the greenhouse from passing beyond a maximum and a minimum threshold value.

The optimum conditions of temperature, luminosity and humidity are well known for each species and each stage of development of one particular species. A greenhouse according to the invention makes it possible to control very effectively the two factors luminosity and temperature in order to create the best possible climate inside the greenhouse.

Operation is as follows.

During hours of sunshine, the liquid 19 is caused to circulate in the primary circuit 8, 9, 13, 11a, 11b, 6a, 6b, 4, 7.

The liquid 19 which is circulating in the collectors 4 forms a selective filter which absorbs I.R., which allows U.V. close to the visible to pass through and which absorbs (and possibly reflects, visible radiation, with a coefficient of absorbtion (and possibly of reflection) which varies with the concentration of the product P in the suspension.

The panels 4 operate as traps for solar energy and the energy thus trapped is transferred in the exchanger 12 to a secondary circuit 32 which includes the reservoirs for storing thermal energy. Preferably several reservoirs are used 33a, 33b, 33c which are arranged in cascade in such a way that stratification of the heat-carrying liquid which is circulating in circuit 32 is produced, this being for example water.

The reservoir 33a contains the hottest water whilst the reservoir 33c contains the coldest water. The water is taken from the base of reservoir 33 by a circulation pump 34 and is sent towards the exchanger 12.

The greenhouse 1 includes a heating installation 35 of a known type, for example an apparatus for producing hot air which is blown into the greenhouse by means of unit heaters 36 or any other low temperature heating installation of a known type.

The hot water which is stored in reservoirs 33a, 33b, 33c is used for feeding the heating installation 35. During the night time or during cold periods, the circulation of liquid in the panel 4 is interrupted and these do not perform the function of a radiator. On the contrary, they act as a thermal screen in combination with the free space 5 and the coefficient of thermal loss from the covering is reduced by half, which makes it possible to save on energy. The panels 4 also have the function during sunshine hours, of shades which have an adjustable opacity, so that it is possible to control the luminous intensity in the visible spectrum inside the greenhouse despite variations in external luminosity.

The concentration of the suspension is controlled by making use of the sedimentation reservoir 9, the electrovalves 15b, 15d, 15f and the circulation pumps 10a, 10b, 10c.

FIG. 1 shows shematically a control box 37 which is for example an electronic regulator. A sensor for the outside temperature 38, a photo-electric sensor for luminous flux 39, a temperature sensor 40 and a sensor for luminous flux 41 placed inside the greenhouse, a thermostat 42 which is intended to display and to compare temperatures at the level of the crop, a sensor 43 for measuring soil temperature as well as temperatures probes 44, 45 which measure the temperature in the primary circuit and the temperature in the secondary circuit and probes 46 and 47 which measure the temperature at the hottest and the coldest points of the store 33, are connected to this control box.

The regulator box 37 automatically regulates the pumps 10a, 10b and 10c as well as the electrovalves 15b, 15d and 15f and act on the flow rate of the liquid 19 in the primary circuit, which causes the concentration of the suspension to vary.

When there is circulation through all the pumps and all the electrovalves are open, the flow rate is at a maximum, and no sedimentation of product P is produced in the tank 9, the concentration of the suspension is at a maximum and the coefficient of absorbtion of the visible spectrum is at the maximum. The collectors 4 constitute opaque shade within the visible spectrum. When one or two pumps 10 are stopped and one or two electrovalves 15 are closed, the flow rate of liquid 19 diminishes. Sedimentation of Product P occurs in the base of reservoir 9, in the pipe stubs 13 which are no longer in service. The concentration of the suspension diminishes and the coefficient of absorbtion of the visible spectrum also diminishes.

Regulation can be carried out, for temperature, either by differential comparison of the outside temperature measured by sensor 38 with an inside temperature measured by sensor 40, or by differential comparisons of the temperatures of fluid 19 at the entry and the outlet of the absorbers, or by differential comparisons of the temperatures at the level of the crops and of the primary and secondary fluids, or by a combination of these various possibilities of regulation.

Regulation of the intensity and luminosity can be obtained by comparison of the intensity of the luminous flux measured in the enclosure by a sensor 41 with a displayed threshold.

With the aid of regulation which takes into account the temperatures and luminous intensities in cascade, it is possible to govern the temperatures and the luminosity inside the enclosure. Evaporation from the plants and from the soil are reduced and watering and ventilation, which may be automated, are very substantially reduced.

A greenhouse according to the invention associated with a device for regulation 37, makes it possible to analyse in a permanent manner, the following climatic parameters: temperature, hygrometry, luminosity and wind speed, to compare these variables with required reference values and to govern inside the enclosure, the visible luminosity, the temperatrue of the ground, the ambient temperature and the moisture content.

It is thus possible to regulate the growing rythm of plants and to plan the rythm of production whilst at the same time reducing the consumption of water and energy.

Shelters which are climatised according to the invention, including the solar collectors which form screens of controllable opacity can be used not only for cultivating plants, but may also be used as premises for the ripening and the preservation of fruit and vegetables or for premises for breeding animals and fish.

It is possible to cause the collectors 4 to operate for cooling the atmosphere inside the greenhouse and at the same time the installation for heating 35 to operate in order to heat up the ground or the region close to the ground, which is obviously not possible in an installation where the panels 4 operate alternatively as collectors and as radiators.

Obviously, without departing from the framework of the invention, various constructional parts of the greenhouse which has just been described by way of example, could be replaced by equivalent parts which fulfill the same functions.

We claim:

1. Device for climatising greenhouses and other shelters for growing plants which comprises a transparent covering, solar collectors consisting of two transparent plates which define between them a space in which a heat-carrying liquid circulates and a closed circuit including the said collectors, which collectors are placed under said transparent covering, the heat-carrying liquid being composed of a suspension in water of a product which is heavier than water, which partly absorbs the visible spectrum, and means for varying the concentration of the said suspension as a function of the outside luminosity so that the said collectors constitute an artificial shade having a variable and controllable opacity.

2. Device according to claim 1, in which the said closed circuit includes a sedimentation reservoir provided with several outlets which are arranged on the lower part of the said reservoir and means for closing and opening automatically the said outlets as a function of the intensity of the luminous flux, whereby the concentration and the absorbing power of the suspension which circulates in the collectors varies.

3. Device according to claim 2, in which the said sedimentation reservoir is a horizontal cylindrical reservoir provided with outlets, in the form of converging pipe stubs, which are arranged along the lower generatrix of the said reservoir.

4. Device according to claim 2, wherein each of the said outlets is provided with means for controlling the circulation, which means are automatically controlled by an automatic regulating device to which sensors for temperature and sensors for luminous flux situated inside and outside the greenhouse are connected.

5. Device according to claim 2, in which the said sedimentation reservoir is at the same time a cross-flow tubular heat exchanger, in which the said suspension circulates downwardly outside the tubes and a heat-carrying liquid circulates in the exchanging tubes.

6. Device according to claim 5, in which the said heat-carrying liquid circulates in a closed secondary circuit which includes a reservoir for accumulation of thermal energy having stratification or several reservoir mounted in cascade, the base of each reservoir being connected to the top of the one which follows it and the bottom of the coldest reservoir being connected to the inlet to the said exchanger.

7. Device according to claim 5, in which the said greenhouse includes an installation for heating which is independent of the collectors and which is supplied by the hot water stored in the said reservoirs for accumulation.

8. Device according to claim 1, in which the said collectors are made up by collector elements which are placed side by side, and in which each collector element comprises a plate having a honeycomb structure in a transparent plastics material, and which rests against the lower face of the frame and two collectors of rectangular cross-section, consisting of the same substance each having a longitudinal opening in which the sides of the plate which are perpendicular to the channels are engaged.

9. The device according to claim 7, wherein said transparent plastic material is a polycarbonate of several millimeters thickness.

10. The device according to claim 8, wherein said transparent plastics material is transparent to ultra-violet light close to the visible and to the visible spectrum with an energy and optical transmission factor greater than 80%.

11. Process for climatising greenhouses and other shelters for the growing of plants which consists of covering said greenhouses with a transparent covering having transparent channels, causing a fluid which is heat-transporting and which partially transmits and partially absorbs the solar light to circulate in said channels, wherein said heat-transporting fluid is a suspension in a fluid of a product which partially absorbs the visible light over the whole width of the spectrum with a uniform coefficient of absorption which varies with the concentration of the suspension and means are provided to vary the concentration of the suspension as a function of the intensity of the light whereby said covering constitutes an artificial shade having an opacity which is variable and adjustable from completely transparent to completely opaque to visible radiation.

12. Process according to claim 11, wherein the concentration of said suspension is regulated as a function of both the intensity of the light and temperature in cascade.

13. Process for climatising greenhouses and other shelters for the growing of plants which consists of covering said greenhouses with a transparent covering, arranging transparent absorbers under said transparent covering, and circulating in said transparent absorbers during periods of sunshine, a suspension in water of a product which is heavier than water which partly absorbs the visible spectrum over the whole width of the spectrum with a uniform coefficient of absorption which varies proportionally to the concentration of the suspension, and which is transparent to ultraviolet radiation, varying the proportion of the product in suspension as a function of the intensity of the luminous flux by making the said suspension circulate in a sedimentation reservoir which makes it possible to modulate the amount of product which becomes sedimented in the bottom of the reservoir.

14. Process according to claim 13 wherein the said product in suspension in the water is a finely divided solid mineral product of white color.

15. Proccess according to claim 13, in which the said product which is in suspension in water is a liquid composed of a mixture of at least one organic liquid which is a member selected from the group consisting of the phthalates of a monovalent alkyl group or ricin oil and at least one liquid surfactant, which is a member selected from the group consisting of aromatic sulfonates and the alkaline or ammonium salts thereof.

16. Process according to claim 13, wherein the said product in suspension in the water is a finely divided solid mineral product, which is a member selected from the group consisting of an oxide of zinc, an oxide of titanium and basic bismuth nitrate, which mineral product is mixed with a liquid surfactant.

17. Process for climatising greenhouses and other shelters for the growing of plants which consists of covering said greenhouses with a transparent covering having transparent channels, causing a fluid which is heat-transporting and which partially transmits and partially absorbs the solar light to circulate in said channels, wherein said heat-transporting fluid is a suspension in a fluid of a product which partially absorbs the visible light over the whole width of the spectrum with a uniform coefficient of absorption which varies with the concentration of the suspension and wherein the concentration of said suspension is regulated as a function of the temperature in the interior of said greenhouse whereby said covering constitutes an artificial shade having a variable and adjustable opacity.

* * * * *